(12) United States Patent
Hayashi

(10) Patent No.: US 12,327,100 B2
(45) Date of Patent: Jun. 10, 2025

(54) INFORMATION PROCESSING APPARATUS, SETTINGS APPLYING METHOD, AND MEDIUM

(71) Applicant: Canon Kabushiki Kaisha, Tokyo (JP)

(72) Inventor: Ruri Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 18/309,875

(22) Filed: May 1, 2023

(65) Prior Publication Data

US 2023/0367573 A1 Nov. 16, 2023

(30) Foreign Application Priority Data

May 10, 2022 (JP) ................................. 2022-077693

(51) Int. Cl.
*G06F 8/61* (2018.01)
*G06F 8/71* (2018.01)
*H04N 1/00* (2006.01)

(52) U.S. Cl.
CPC ................. *G06F 8/61* (2013.01); *G06F 8/71* (2013.01); *H04N 1/00938* (2013.01)

(58) Field of Classification Search
None
See application file for complete search history.

(56) References Cited

U.S. PATENT DOCUMENTS

| 9,740,444 | B2 | 8/2017 | Hayashi | |
|---|---|---|---|---|
| 11,140,291 | B2 | 10/2021 | Kogure et al. | |
| 2010/0281476 | A1* | 11/2010 | Ebi | H04N 1/00 717/174 |
| 2016/0092281 | A1* | 3/2016 | Nakawaki | G06F 9/44505 719/320 |
| 2017/0031675 | A1* | 2/2017 | Oshima | G06F 8/65 |
| 2019/0354324 | A1* | 11/2019 | Kakitsuba | G06F 3/1204 |

FOREIGN PATENT DOCUMENTS

JP 2019212242 A 12/2019

* cited by examiner

*Primary Examiner* — Andrew M. Lyons
(74) *Attorney, Agent, or Firm* — Venable LLP

(57) ABSTRACT

An information processing apparatus is provided. According to a setting applying instruction included in received instruction information, the apparatus applies a setting value included together with the setting applying instruction to a specified application program. The applying includes stopping the specified application program after the specified application program has been started, applying a setting value received together with the setting applying instruction to a setting value of the application program when stopped, and starting the application program with the setting value applied.

7 Claims, 10 Drawing Sheets

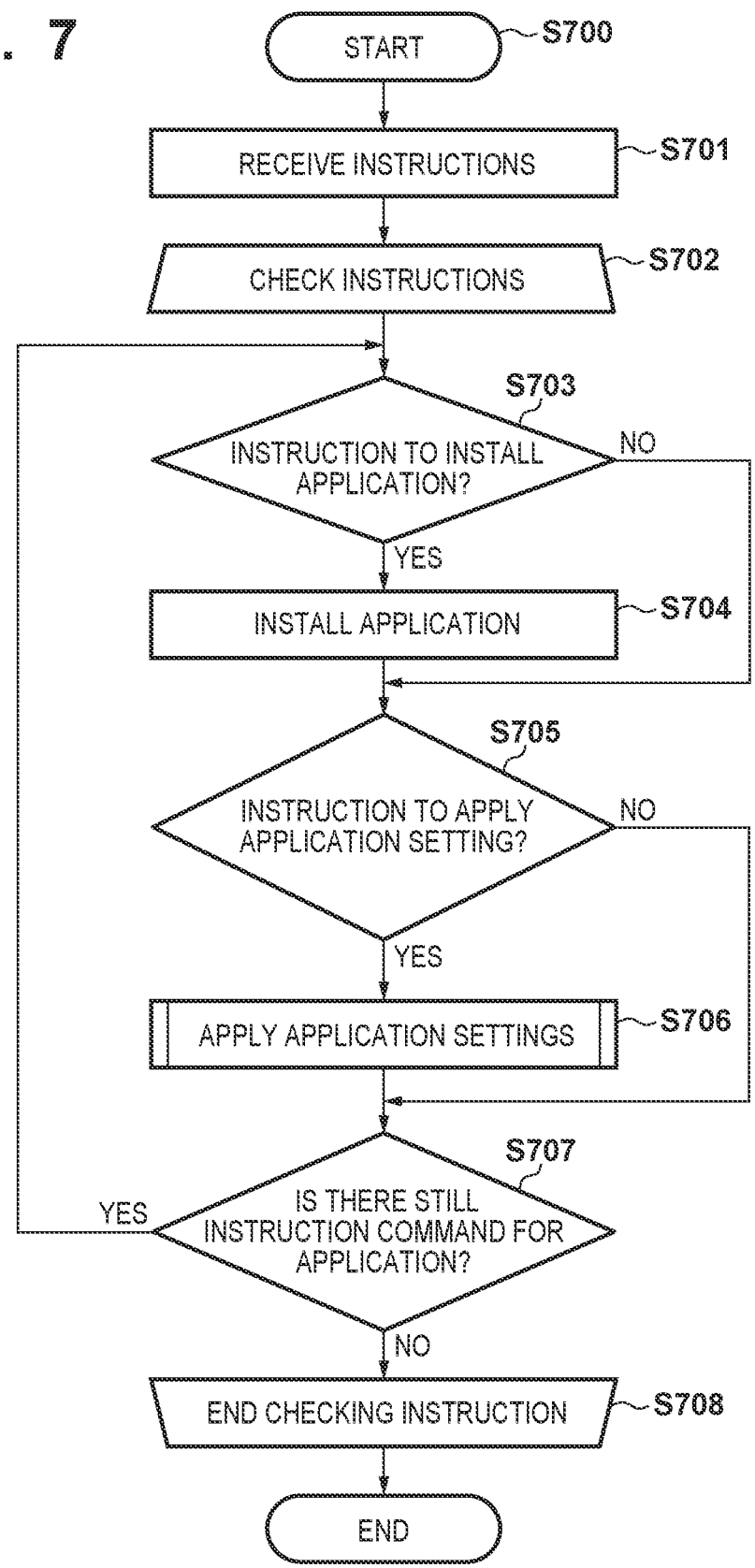

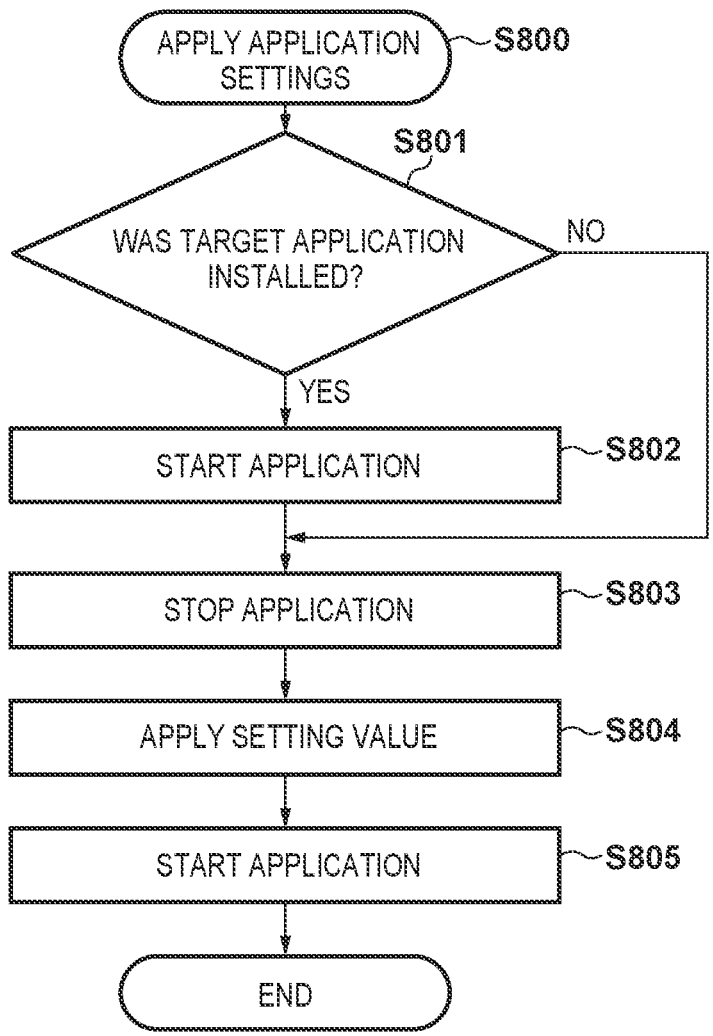

FIG. 11A

SETTING VALUE OF FUNCTION EXTENSION APPLICATION 1 (IMAGE FORMING APPARATUS) — 1100

```
applicationid:1111-1111
 | - appsetteings
      |-Key1 - valuez
      |-Key2 - testvalue
      |-Key3 - value3
      |-Key4 - value4
```
— 1101

FIG. 11B

SETTING VALUE OF FUNCTION EXTENSION APPLICATION 2 (IN IMAGE FORMING APPARATUS) — 1110

```
applicationid:2222-2222
 | - appsetteings
      |-Key1111 - value1111
      |-Key2222 - value2222
```
— 1111

FIG. 11C

SETTING VALUE OF FUNCTION EXTENSION APPLICATION 2 (IN IMAGE FORMING APPARATUS) — 1120

```
applicationid:2222-2222
 | - appsetteings
      |-Key1111 - value1111
      |-Key2222 - value2222
      |-Keyx - valuexxxx
```
— 1121

FIG. 11D

SETTING VALUE OF FUNCTION EXTENSION APPLICATION 2 (IN IMAGE FORMING APPARATUS) — 1130

```
applicationid:2222-2222
 | - appsetteings
      |-Key1111 - value1111
      |-Key2222 - value2222
      |-Keyx - appvalue
```
— 1131

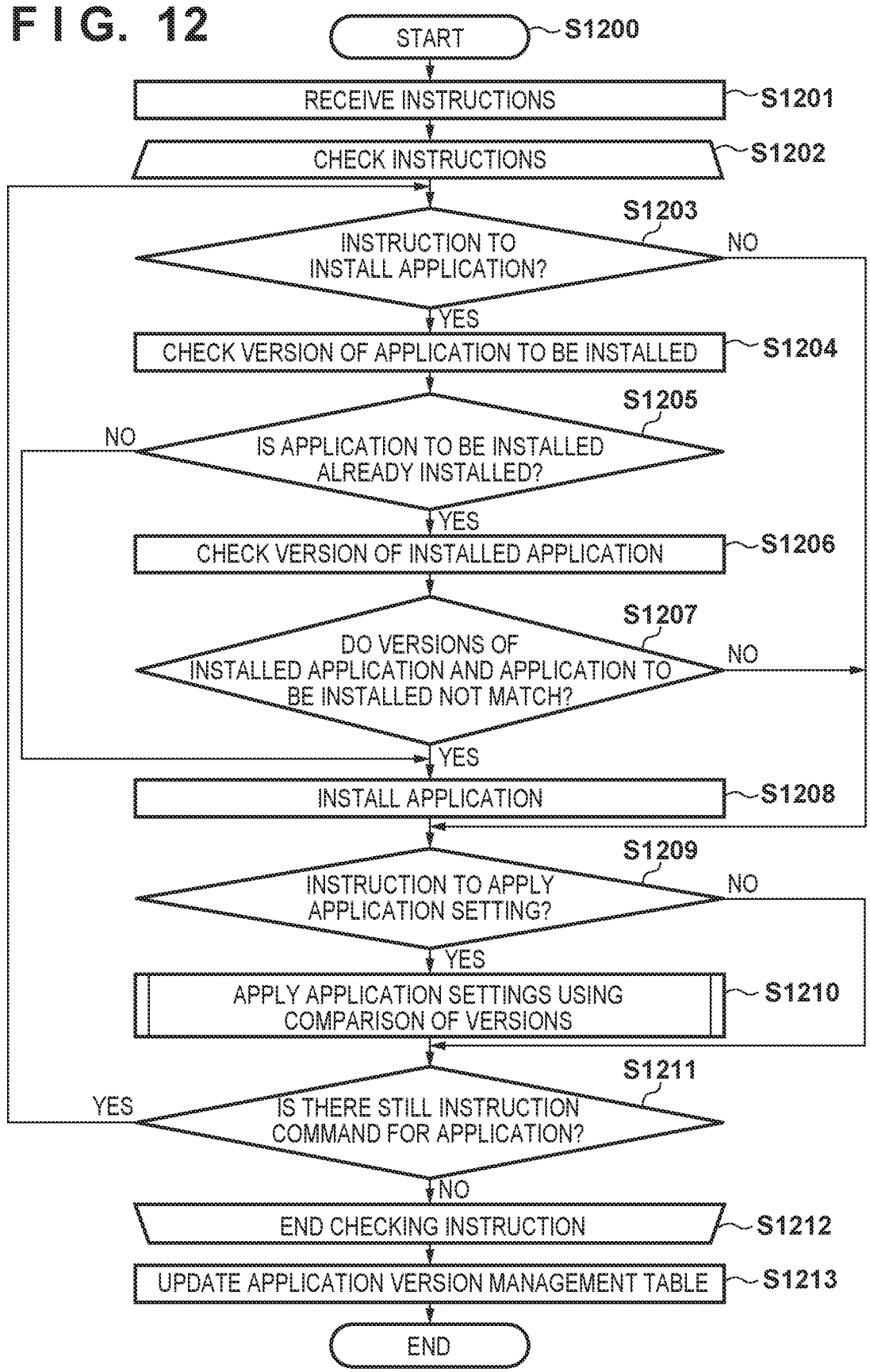

INFORMATION PROCESSING APPARATUS, SETTINGS APPLYING METHOD, AND MEDIUM

BACKGROUND OF THE INVENTION

Field of the Invention

The present invention relates to an information processing apparatus that imports settings data of an installed function extension application, a settings applying method, and a medium.

Description of the Related Art

Recently, image forming apparatuses are being provided with an application program operating environment such as a JAVA (registered trademark) environment. Utilizing the program portability of JAVA (registered trademark), techniques have been developed to provide an extensible application program to image forming apparatuses. By creating an application program that runs on an application program operating environment such as a JAVA (registered trademark) environment and installing the application program in an image forming apparatus afterwards, a desired function can be achieved via the application program. This can improve the functions and usability of an image forming apparatus. An example of an application platforms is the Open Services Gateway Initiative (OSGi) Service Platform, which is a JAVA (registered trademark) application platform designed to be embedded in devices. In OSGi, a bundle is defined as a management unit for a software module, and specifications for managing a life cycle including install, start, stop, update, and uninstall are defined. The term bundle means a JAVA (registered trademark) module. A bundle for function extension installed afterwards is hereinafter referred to as a function extension application or a function extension program.

A function extension application stores settings data relating to its own functions as a settings file in a storage apparatus of an image forming apparatus and stores setting values (or a setting value) in a database of the image forming apparatus in the format of a key name and a value. When the function extension application is installed and execution is started, the setting values stored by the function extension application are registered in the database as initial values for the corresponding setting items in the format of a key name and a value, and when the settings file is read, the setting values become usable. When upgrading the version of a function extension application with a function addition or the like, the configuration of the settings data may be changed by adding or discarding the settings items, compromising the compatibility of the settings data between the old version and the new version. Regarding this, a known technique in which version information and compatibility information are given to the setting values of the function extension application and the setting values are imported after checking for compatibility has been proposed (Japanese Patent Laid-Open No. 2019-212242).

In the technique of Japanese Patent Laid-Open No. 2019-212242, since all of the setting values held by the function extension application are imported to the image forming apparatus, even for setting items with setting values wished to be carried over from the previous version, the setting values are rewritten as new setting values. If the setting values of the function extension application are changed when only one or more setting items wished to be changed, the following problems occur.

After the function extension application is installed, there is nowhere to store the setting values of the function extension application in the database of the image forming apparatus. In other words, the key names and values for managing the setting values cannot be registered, and the database is not configured as a database for setting values to be referenced by the function extension application. In this state, forcibly setting the setting values wished to be changed results in the setting values being set in an incomplete state. If the function extension application is started with the setting values in an incomplete state, the function extension application checks the setting values, determines that the setting values are incomplete and unable to be used, and then overwrites all of the setting values with initial values when reconfiguring the database with setting values. Accordingly, the function extension application runs with values set that are different from the setting values that the user wanted to be set.

SUMMARY OF THE INVENTION

According to the present invention, the function extension application is run with the original setting values being carried over and a setting value for one or more setting items being imported.

To achieve the object described above, the present invention has the following configuration. An aspect of the present invention provides an information processing apparatus comprising: at least one memory storing at least one program; and at least one processor, wherein the at least one program causes the at least one processor to perform: according to a setting applying instruction included in received instruction information, applying a setting value included together with the setting applying instruction to a specified application program, and the applying includes: stopping the specified application program after the specified application program has been started, applying a setting value received together with the setting applying instruction to a setting value of the application program when stopped, and starting the application program with the setting value applied.

According to the present invention, the function extension application can be run with the original setting values being carried over and a setting value for one or more setting items being imported.

Further features of the present invention will become apparent from the following description of exemplary embodiments (with reference to the attached drawings).

BRIEF DESCRIPTION OF THE DRAWINGS

FIG. 7 is a flowchart of function extension application installation and setting value application.

FIG. 8 is a flowchart of setting value application for a function extension application.

FIGS. 9A and 9B are function extension application version management tables for an image forming apparatus.

FIGS. 11A to 11D are diagrams illustrating setting values of a function extension application for an image forming apparatus.

FIG. 12 is a flowchart of installation and setting value application using a comparison of function extension application versions.

DESCRIPTION OF THE EMBODIMENTS

Figure 1:
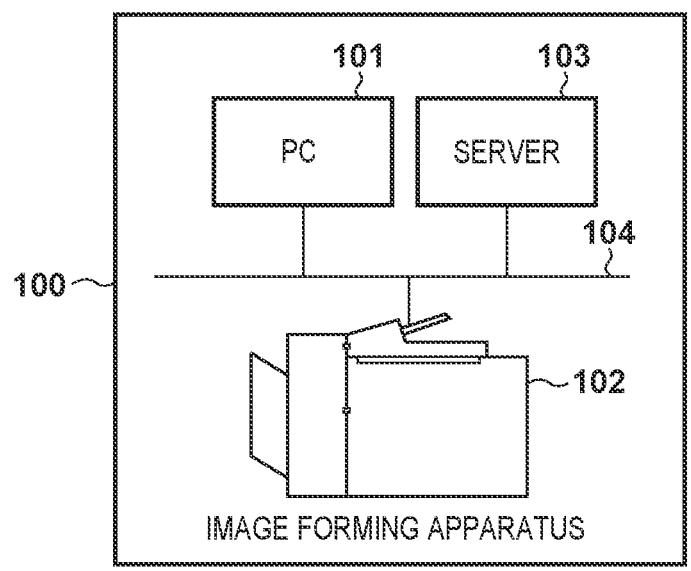
FIG. 1 is an overall diagram of a setting value application system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Description of System Configuration Example

FIG. 1 is an overall system diagram for describing the overall configuration of a system 100 including an image forming apparatus that operates as an information processing apparatus according to an embodiment of the present invention. The present invention may be configured so that the image forming apparatus is connected to a network or not connected to a network. With the former configuration, the version upgrades and setting values (or a setting value) imports for the function extension application of the image forming apparatus are performed via the network. With the latter configuration, the image forming apparatus is provided with an interface for a storage medium such as USB memory, and the version upgrades and setting values imports for the function extension application of the image forming apparatus are performed via the storage medium. FIG. 1 illustrates a configuration in which an image forming apparatus 102 is connected to a network. The system 100 includes a plurality of network devices including the image forming apparatus 102, a PC 101, a server 103, and the like and a LAN 104 connecting the network device group.

The image forming apparatus 102 installs a function extension application and applies setting values according to instruction commands from the PC 101 and the server 103 including function extension application installation and setting value application instructions and instructions from an operation unit 216 of the image forming apparatus 102. Note that the PC 101 and the server 103 may be general-purpose devices and are not particularly limited in the present invention. Thus, the hardware configuration and the software configuration will not be described. Also, the image forming apparatus 102 may be referred to as an information processing apparatus when emphasizing the information processing function.

Description of Hardware Configuration Diagram of Image Forming Apparatus

Figure 2:
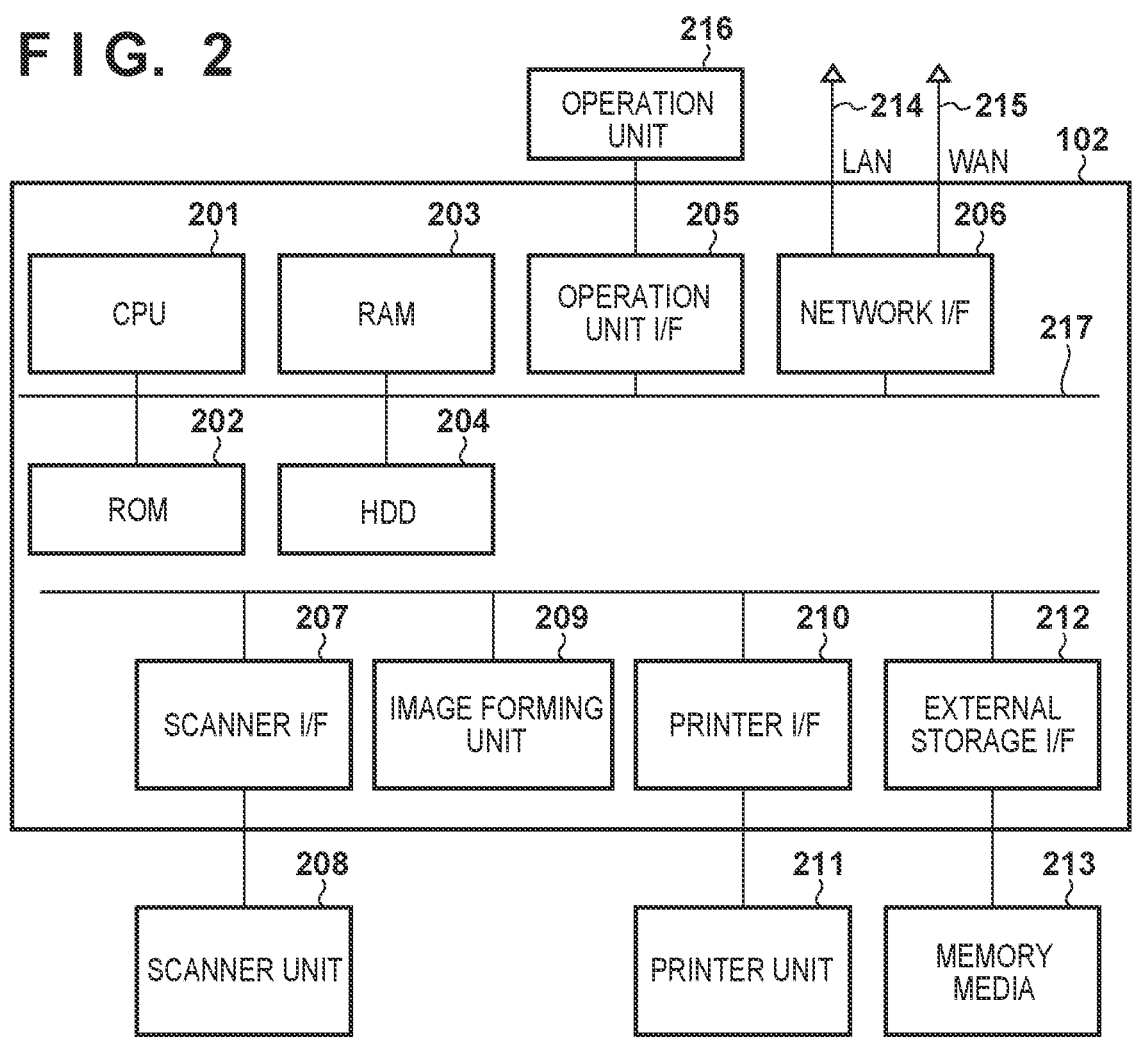
FIG. 2 is a hardware configuration diagram of an image forming apparatus.

FIG. 2 is a hardware configuration diagram of the image forming apparatus 102 provided with a print function, a scan function, a network communication function, and the like. The image forming apparatus 102 is electrically connected to a scanner unit 208 and a printer unit 211 and is connected to external devices including the PC 101 and the server 103 via a LAN 214.

A CPU 201 executes control programs and the like stored in a ROM 202 and the like, comprehensively controls the access with the various pieces of connected hardware, and comprehensively controls the various types of processing executed inside the controller. The ROM 202 is a read-only non-volatile storage area that stores the boot program of the image forming apparatus 102, firmware, and the like. A RAM 203 is a system working memory for operation of the CPU 201 that temporarily stores various types of data. The RAM 203 includes FRAM (registered trademark) and SRAM that can retain stored content after power is turned off, DRAM that loses stored content after power is turned off, and the like. An HDD 204 is a non-volatile storage area that stores system bundles and the like. The firmware of the image forming apparatus is stored in the HDD 204.

An operation unit I/F 205 is an interface unit that connects a system bus 217 and an operation unit 216. Specifically, data for display on the operation unit 216 is received from the system bus 217 and displayed, and input information from the operation unit 216 is output to the system bus 217. User instructions and information presentations associated with the image forming apparatus 102 are performed via the operation unit 216. In other words, the operation unit 216 provides a user interface. A network I/F 206 is connected to the LAN 214, a WAN 215, and the system bus 217 and performs input and output of information with an external device. A scanner I/F 207 is used for correcting and editing the image data received from the scanner unit 208. An image forming unit 209 performs image data direction conversion, image compression, expansion, and the like. A printer I/F 210 receives the image data sent from the image forming unit 209, and the image data is printed at the printer unit 211 after image formation.

An external storage I/F 212 is connected to memory media 213 and stores internal device data and images in the memory media 213. Alternatively, the external storage I/F 212 is used when data in the memory media 213 is written to a device. In this case, the PC 101, the server 103, or the like may write the data to the memory media 213.

Description of System Software Module Hierarchical Diagram

Figure 3:
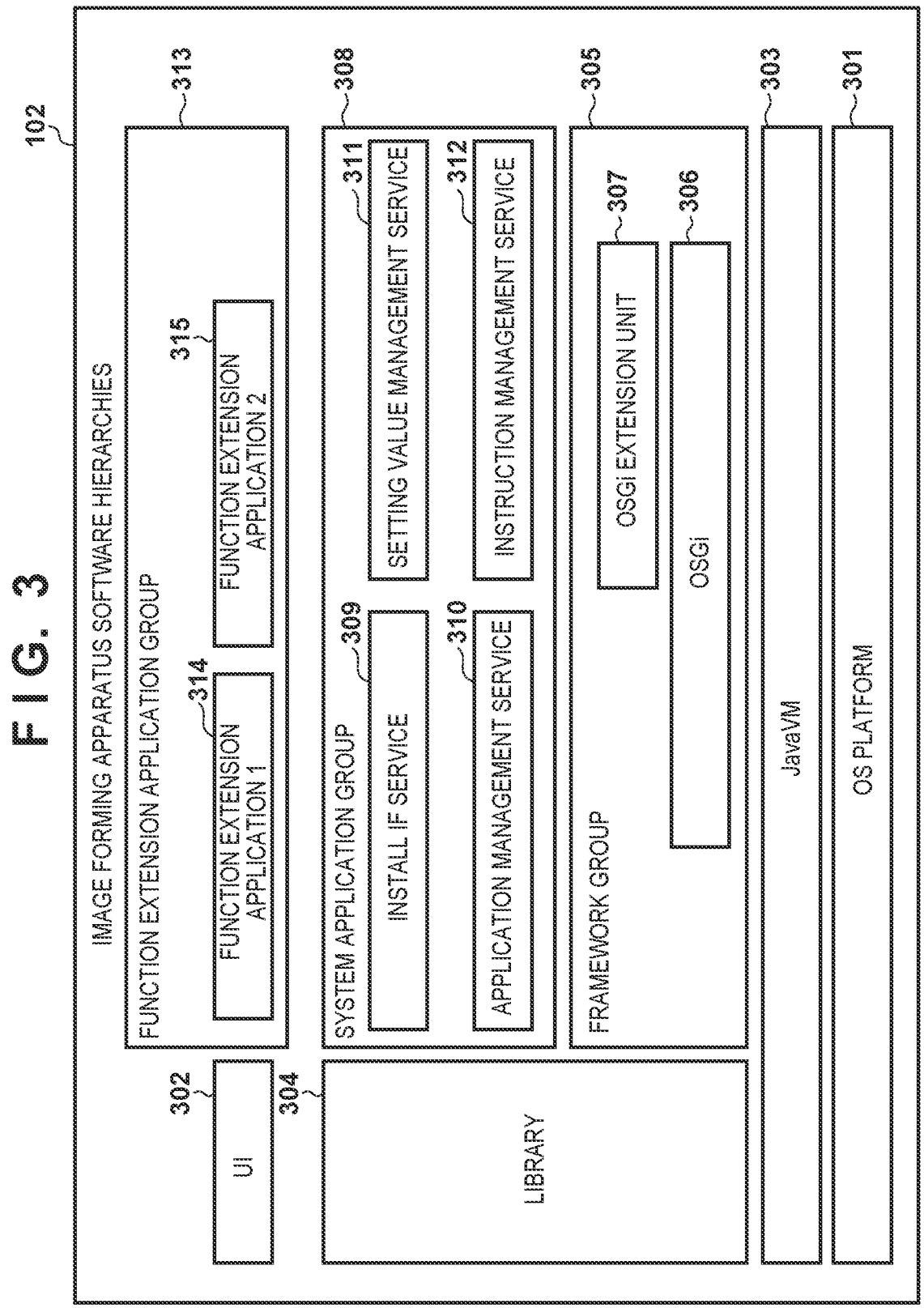
FIG. 3 is a software module hierarchical diagram of an image forming apparatus.

FIG. 3 is a software module hierarchical diagram of the image forming apparatus 102 according to the present invention. Note that each piece of software illustrated in FIG. 3 onward is stored in the ROM 202 or the HDD 204 and executed by the CPU 201. Also, various types of information used when executing are stored in the RAM 203 or the HDD 204 and exchanged between software modules. The network I/F 206 is used to communicate with an external device.

Next, each piece of software will be described. The first example of software is an operating system (OS) platform 301. Hardware and software resources are managed and scheduled by the OS platform 301. A UI 302 is a user interface module that acts as an intermediary between the apparatus and the user operation when an operator performs various types of operations or sets the settings for the image forming apparatus 102. The module transfers input information and processing refers to the various types of modules, changes the settings of data, and the like according to operator operations.

Next, the configuration of the JAVA (registered trademark) side will be described. The software platform on the JAVA (registered trademark) side is configured as a runtime environment for a Java VM 303 and includes, as an interpreter, the Java VM 303, a library 304, and a framework group 305. The library 304 includes a standard API library. The framework group 305 includes an OSGi 306, and the OSGi 306 runs a plurality of bundles on the solitary Java VM 303. Also, an OSGi extension unit 307 that a module responsible for the implementation portion for the OSGi 306 which is an interface specification. The OSGi extension unit 307 indicates that a function can be extended if necessary within a range that satisfies the specifications of the OSGi 306. The OSGi 306 and the OSGi extension unit 307 provide a bundle lifecycle management function, an inter-bundle communication function, and the like.

The bundles installed on the OSGi 306 when the image forming apparatus 102 is shipped include a system application group 308. Examples of system applications include the basic embedded functions of the image forming apparatus 102 such as copying, scanning, printing, and the like and an application management service 310 for managing a plurality of applications, adding new applications, and updating and deleting applications. An install IF service 309 is where install instructions from a PC are received. Specifically, a servlet or a Web service API is provided. An application management service 310 that receives an instruction such as an install instruction via the install IF service 309 operates in accordance with the instruction and adds or updates an application, for example. Applications to be added are included in a function extension application group 313 described below, for example.

A setting value management service 311 manages the setting values of the application, acquires imported setting values, and sets and updates the setting values required by an application.

The function extension application group 313 includes a bundle or bundles of the type to be installed afterwards. Representing the function extension application group 313, a function extension application 314 provides various types of functions to the user with the image forming apparatus 102. For example, the various functions provided include an image editing function, an authentication management function, a department management function such as printing restriction, and the like. The function extension application 314 that implements the various types of functions runs under the management of the application management service 310. A function extension application 315 is similar to the function extension application 314. The application management service 310 holds application information including the versions of applications added under management, for example. Herein, a function extension application may be referred to as simply as an application.

An instruction management service 312 is a service that analyzes instructions received from an external device and generates an instruction to install a function extension application or apply settings according to an instruction included in the instructions. Input of the instructions may be received via the UI 302, via the install IF service 309, or via the memory media 213. Also, the instructions may be received from a function extension application installed afterwards with a function for transmitting instructions. The instructions may include an instruction command, and this instruction command may be simply referred to as an instruction herein. Also, the instructions may include an install instruction to install a function extension application, a setting applying instruction to apply a setting to a function extension program, and various similar instructions and information relating to instructions, and this may be referred to as instruction information herein.

Description of Software Module

Figure 4A:
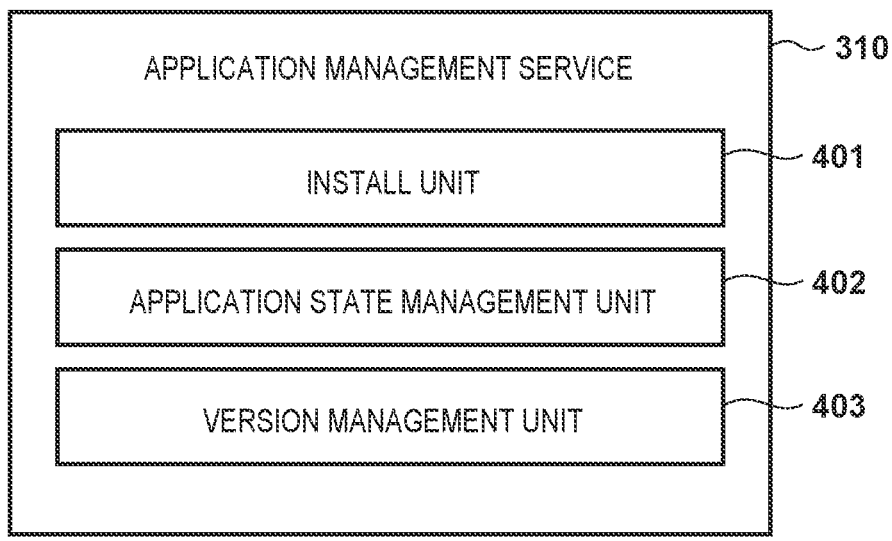
FIGS. 4A to 4C are block diagrams illustrating software module configurations.

FIG. 4A is a block diagram illustrating the module configuration of the application management service 310. An install unit 401 adds, updates, and deletes applications. An application state management unit 402 manages the stop and start states of applications and changes states according to a process or as necessary. A version management unit 403 manages the version of the function extension application installed on the image forming apparatus 102.

Figure 4B:
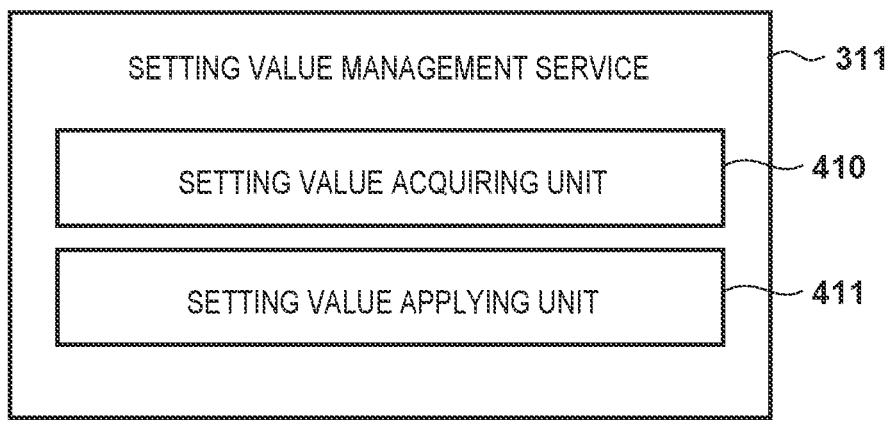

FIG. 4B is a block diagram illustrating the module configuration of the setting value management service 311. A setting value acquiring unit 410 is a module that analyzes and acquires the specified setting values. A setting value applying unit 411 is a module that adds, updates, and deletes setting values for the function extension application.

Figure 4C:
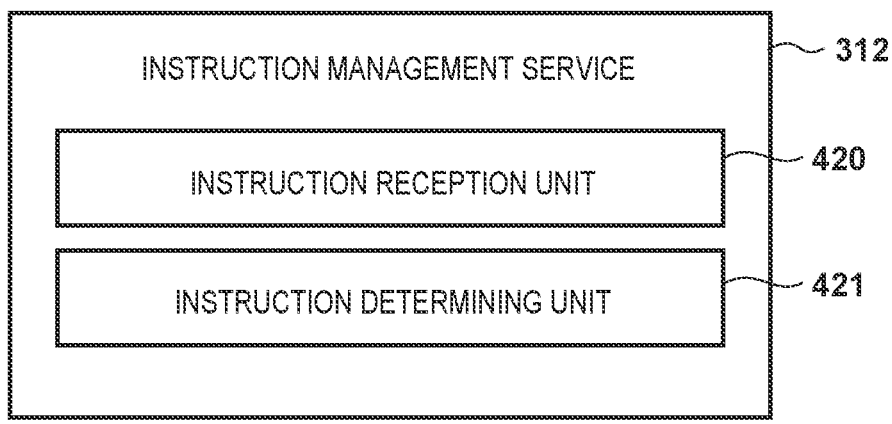

FIG. 4C is a block diagram illustrating the module configuration of the instruction management service 312. An instruction reception unit 420 is a module that receives instructions including an instruction for installing a function extension application and an instruction for applying the setting value of a function extension application. An instruction determining unit 421 is a module that analyzes the instructions received by the instruction reception unit 420 and determines the processing for the function extension application.

Example of Instructions for Function Extension Application

Figure 5:
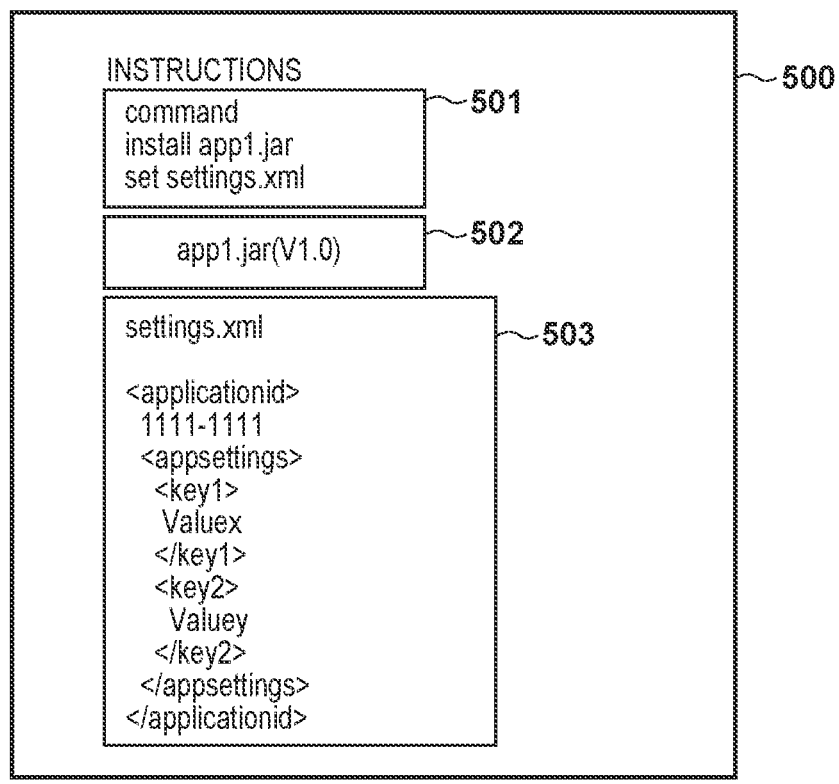
FIG. 5 is a diagram illustrating an example of instructions for a function extension application.

FIG. 5 is an example of instructions 500 for instructing for the installation of a function extension application and for instructing the image forming apparatus 102 regarding an item that is wished to be set.

The instructions 500 are generated by the administrator or serviceperson of the image forming apparatus 102 via a PC application, Web application, or the like for editing instructions. By generating the instructions and the application management service 310 and the like executing processing in accordance with the instructions, the processing in the instruction for the image forming apparatus 102 can be executed all at once. The instruction determining unit 421 analyzes the instruction commands for the image forming apparatus 102 included in the instructions 500 in the processing order, and the module corresponding to the instruction executes the processing corresponding to the instruction command. Also, the instructions 500 includes function extension applications, setting values, and other instructions required to execute the instruction command.

The generated instructions 500 are transmitted to the image forming apparatus 102 by a user, administrator, or serviceperson using a PC application, an external storage such as USB memory, a function extension application function, or the like. The instruction reception unit 420 receives the instructions 500 and executes the instruction commands. The instructions 500 include an install command (install instruction) for installing a function extension application and a set command (setting applying instruction) for applying the setting value of the function extension application. Also, a command for instructing to uninstall, start, or stop the function extension application, a command for updating the firmware, a command for restarting the image forming apparatus 102, and the like may be included.

The instructions 500 according to the present embodiment include an instruction command 501 for installing the function extension application app1.jar and setting the setting value described in settings.xml. Also, the instructions 500 include a function extension application file app1.jar 502 to be installed and a setting value file settings.xml 503 describing the setting items. Note that the instructions 500 may include only a link to the function extension application file or the setting value file, or the file itself may be a different file from the instructions 500.

Specifically, the instructions 500 include an instruction to install the version Ver 1.0 of the function extension application app1.jar. In addition, the instructions 500 include instructions for setting, under a function extension application ID of 1111-1111 key, appsettings as the root, valuex as a Key1 key, and valuey as a Key2 key. Note that the instructions 500 may use a different method than the method according to the present embodiment. Specifically, instruction commands and setting items may be received via an API or may receive setting values in a format that is not the xml format. Furthermore, the application install instruction and the setting value application instruction may be received separately.

Figure 6A:
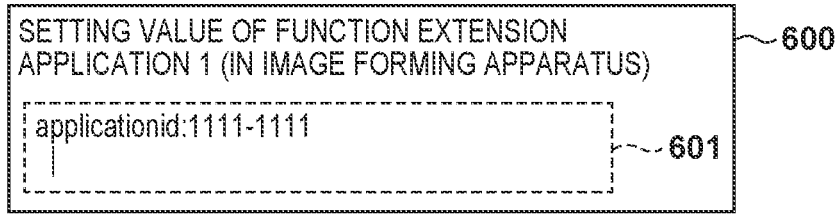
FIGS. 6A to 6C are diagrams illustrating setting values of a function extension application for an image forming apparatus.
Figure 6B:
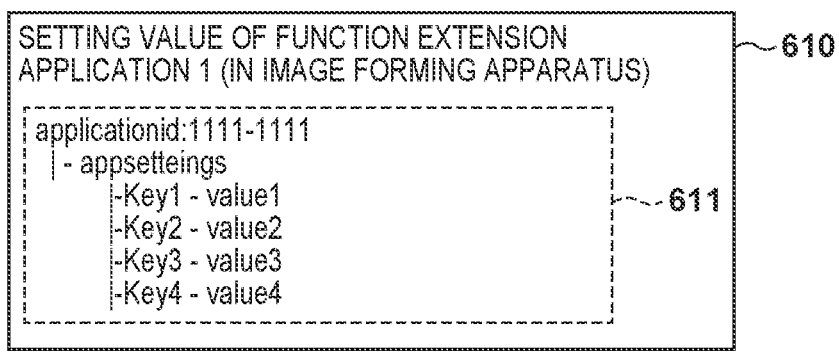
Figure 6C:
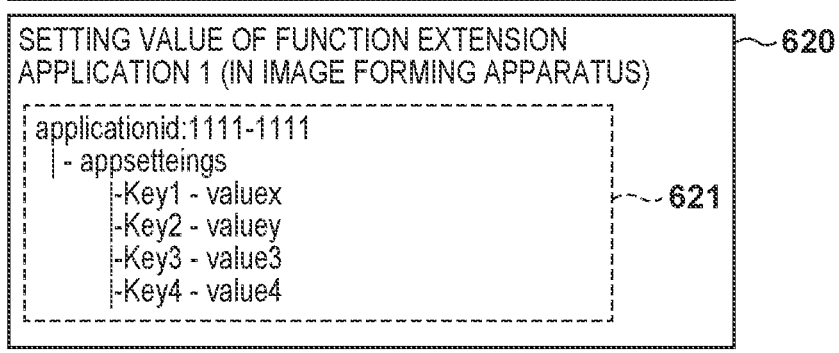

Description of Setting Values of Function Extension Application in Image Forming Apparatus FIGS. 6A, 6B, and 6C are diagrams for describing examples of setting values of a function extension application in the image forming apparatus 102. In this example, the setting values of the function extension application are stored in settings data (or a setting value file or setting value database) including a set of a key and a corresponding value for each setting item. FIG. 6A illustrates the state of setting values, that is the setting value database, immediately after the function extension application app1.jar is installed. In this state, the setting value of the function extension application app1.jar is empty, and a key for applying the setting value does not exist. In other words, at this stage, there is no settings data.

Subsequently, when the application state management unit 402 of the application management service 310 starts the function extension application app1.jar, the function extension application app1.jar configures the initial setting values, setting the setting values in the state illustrated in FIG. 6B. In FIG. 6B, all of the setting values of the function extension application app1.jar are configured, and the initial values are set for all of the keys. The setting values being configured means that a setting value including a key and a value is associated with the application and reconfigured to allow for referencing by the application. The sets of configured setting values may also be referred to as a setting value database. At the stage when the setting values are first configured, settings data 611 including the initial values as the setting values for each setting item exists.

After the initial values for the function extension application app1.jar are set, to apply the setting values specified in the instructions, the application state management unit 402 stops the function extension application app1.jar. After the function extension application app1.jar is put in an inactive state, the setting value acquiring unit 410 analyzes the setting values of the instructions 500, and the setting value applying unit 411 applies the setting values to the keys specified as described in the instructions 500. In the present embodiment, the setting value for the Key1 key is updated from the initial value value1 to the valuex described in the instructions, and the setting value for the Key2 key is updated from the initial value value2 to the valuey described in the instructions. This state is illustrated in FIG. 6C. In other words, at this stage, settings data 612 exists in which the initial values are carried over for the setting values of each setting item except for the setting items instructed to be updated with the applied specified setting values.

Function Extension Application Installation and Setting Value Applying Processing Next, the flow of installing the function extension application and applying the setting values will be described using FIGS. 7 and 8. The flow of FIGS. 7 and 8 is executed by the application management service 310, the setting value management service 311, and the instruction management service 312. On the hardware side, the flow of FIGS. 7 and 8 is executed by the CPU 201.

The instruction reception unit 420 of the instruction management service 312 receives instructions including a function extension application install instruction and a setting value application instruction (step S701). The instruction reception unit 420 may receive the instructions 500 via the install IF service 309 or may receive the instructions 500 via the UI 302. Alternatively, the instructions 500 may be received by a different function extension application that instructs for application installation and setting value application.

When the instructions 500 are received, the instruction determining unit 421 analyzes the instructions 500 (step S702). The analysis can be performed using the instruction commands described in the instructions 500 as target instruction commands to be sequentially processed. As a result of the analysis, the instruction determining unit 421 determines whether or not the instruction command described in the instructions 500 is a function extension application install instruction (step S703). When the instruction command is not a function extension application install instruction, the processing proceeds to step S705. When the instruction command is a function extension application install instruction, the instruction determining unit 421 instructs the install unit 401 of the application management service 310 to install the function extension application. The install unit 401 installs the function extension application (step S704).

Specifically, the instruction determining unit 421 reads the instruction command 501 of the instructions 500 and determines whether the instruction command 501 is a function extension application install instruction. When the function extension application app1.jar to be installed is included in the instructions 500, the install unit 401 installs app1.jar. Then, if there is another instruction command, it is set as a new target instruction command to be processed. Otherwise, the processing branches to step S708.

Subsequently, the instruction determining unit 421 determines whether or not the target instruction command is an instruction to apply setting values to the function extension application (step S705). When the target instruction command is determined to not be the instruction to apply the setting values to the function extension application, the processing proceeds to step S707.

However, when the instruction command is the instruction to apply the setting values to the function extension application, the processing proceeds to step S706 and the setting values are applied to the function extension application. When the target instruction command 501 is the set instruction (setting applying instruction) for settings.xml, since "settings.xml" is included in the instructions 500, the processing proceeds to setting applying processing (step S706).

The details of step S706 will be described with reference to FIG. 8. In step S801, the instruction determining unit 421 determines whether the target function extension application has been installed before processing for applying the setting values to the function extension application (step S801). In other words, it is determined whether the function extension application specified as the target for applying settings is the application installed in step S704 according to the install instruction included in the instructions including the setting application instruction. When the function extension application specified as the target has not been installed according to the install instruction included in the same instructions as the setting applying instruction, the processing proceeds to step S804. The determination of step S801 may be executed by the following process, for example.

First, the setting value file (for example, the setting values 503) specified in the setting applying instruction to be processed included in the same instructions 500 as the setting applying instruction to be processed is referenced, and the target application ID is referenced. Then, the install instruction for the function extension application with the name corresponding to the application ID is searched for in the instructions 500. When successfully found, it can be determined that the function extension application specified as the target for applying settings is the application installed in step S704 according to the install instruction included in the instructions including the setting applying instruction. Note that the association between the application ID of the function extension application and the name of the corresponding function extension application name may be specified separately. Alternatively, the association may be included in the instructions 500. Also, the association may be included in a setting value file (for example, the setting value file 503) describing a setting item.

In step S801, when it is determined that the function extension application specified as the target for applying settings has been installed, the application state management unit 402 of the application management service 310 starts the installed function extension application (step S802). In other words, the installed function extension application is transitioned to a started state. By starting the function extension application, the database is configured with the setting values held by the function extension application as illustrated in FIG. 6B, and the initial setting values are applied.

Subsequently, the application state management unit 402 stops the function extension application started in step S802 (step S803). In other words, the installed function extension application is transitioned to a stopped state. Since operation of the function extension application cannot be guaranteed when rewriting the setting values while the function extension application is in use, the function extension application is stopped before the setting value applying processing. The following are plausible stopping methods. For example, the function extension application may be stopped when a predetermined amount of time has elapsed from the start of the function extension application. The predetermined amount of time is set to be equal to or longer than the amount of time required to complete configuring the setting value database from the start. Here, since not only the installed function extension application but other applications may also be executed in parallel, a generous amount of time from the start to the stop may be set. Alternatively, a code may be embedded in the function extension application for stopping according to a condition when configuration of the setting value database is complete, and execution of the function extension application is started after the condition is set to 'stop' before step S802. The setting values are updated according to the setting values of the instructions if the function extension application is stopped, and execution of the function extension application is started in step S805 after then condition described above is set to 'not stopped'. In this case, the function extension application is stopped not by an external device but by the function extension application itself.

Subsequently, the setting value acquiring unit 410 acquires the setting value 503 described in the instructions 500, and the setting value applying unit 411 applies the acquired setting value as the setting value for the function extension application (step S804). The setting value can be applied by acquiring a key and a corresponding value included in the setting value 503, searching the database for a setting value using the acquired key, and substituting the value corresponding to the key with the acquired value. When there are a plurality of sets of a key and a value, this processing may be executed for each set. After the setting values are applied, to enable the function extension application to be used, the application state management unit 402 starts the function extension application (step S805), and the function extension application settings application processing ends. This ends step S706.

Following step S706, the instruction determining unit 421 determines whether or not another instruction command 501 for the function extension application exists in the instructions 500 (step S707). When a non-executed instruction command 501 exists, the processing from step S703 to step S707 is repeated with this instruction command as the processing target, and processing on all of the instruction commands 501 is executed. Note that in the present embodiment, as described above, functions not relating to the installation of the function extension application and applying a setting value are not described in detail.

Thus, when an instruction command other than a function extension application install instruction command and a setting value applying instruction command is described in the instructions 500, processing according to this instruction command is executed before determining whether there is a following instruction command in step S707. When it is determined that processing for all of the instruction commands 501 has been executed in step S707, the present flow ends (step S708).

As described above, according to the present embodiment, the image forming apparatus 102 can run the function extension application with the settings applied using only the setting values wished to be changed. Regarding setting values that do not wished to be changed, the setting values of the function extension application of the previous version are carried over. Thus, the effort of a worker generating instructions can be reduced and the amount of data transferred can be reduced. Also, various users can generate a function extension application using a publicly-available software design kit (SDK), but the function extension application can be run even when applying correct setting values when revising.

Second Embodiment

Next, another embodiment of the present invention will be described. The first embodiment is an example in which the function extension application is newly installed and the setting values are applied. By upgrading the version of the function extension application via a function extension of the function extension application, the number of items for setting values may increase. Thus, the setting values changed by the user in the current version must be kept and the setting values of the upgraded version of the function extension application must be applied. In the method of the present embodiment, setting values are held during the version upgrade of the function extension application and the setting values for the one or more setting items that need to be updated are correctly applied.

Management of Function Extension Application Installed on Image Forming Apparatus FIGS. 9A and 9B are examples of information for managing a function extension application installed on the image forming apparatus 102. The version management unit 403 of the application management service 310 manages the application ID of the installed function extension application and the version with a version management table.

FIG. 9A is an example of a version management table, and the following two entries for the function extension application installed on the image forming apparatus 102 are managed via a version management table 900.

Application ID: 1111-1111, Version: V1.0
Application ID: 2222-2222, Version: V1.0

Note that information such as the application name and the like may be added to the function extension application management table as necessary.

When version V2.0 of the function extension application ID of 2222-2222 is installed, the version management table for the function extension application is updated as illustrated in a version management table 910 in FIG. 9B. This indicates that the version V2.0 of the function extension application with the application ID of 2222-2222 has been installed.

Example of Instructions for Function Extension Application

Figure 10:
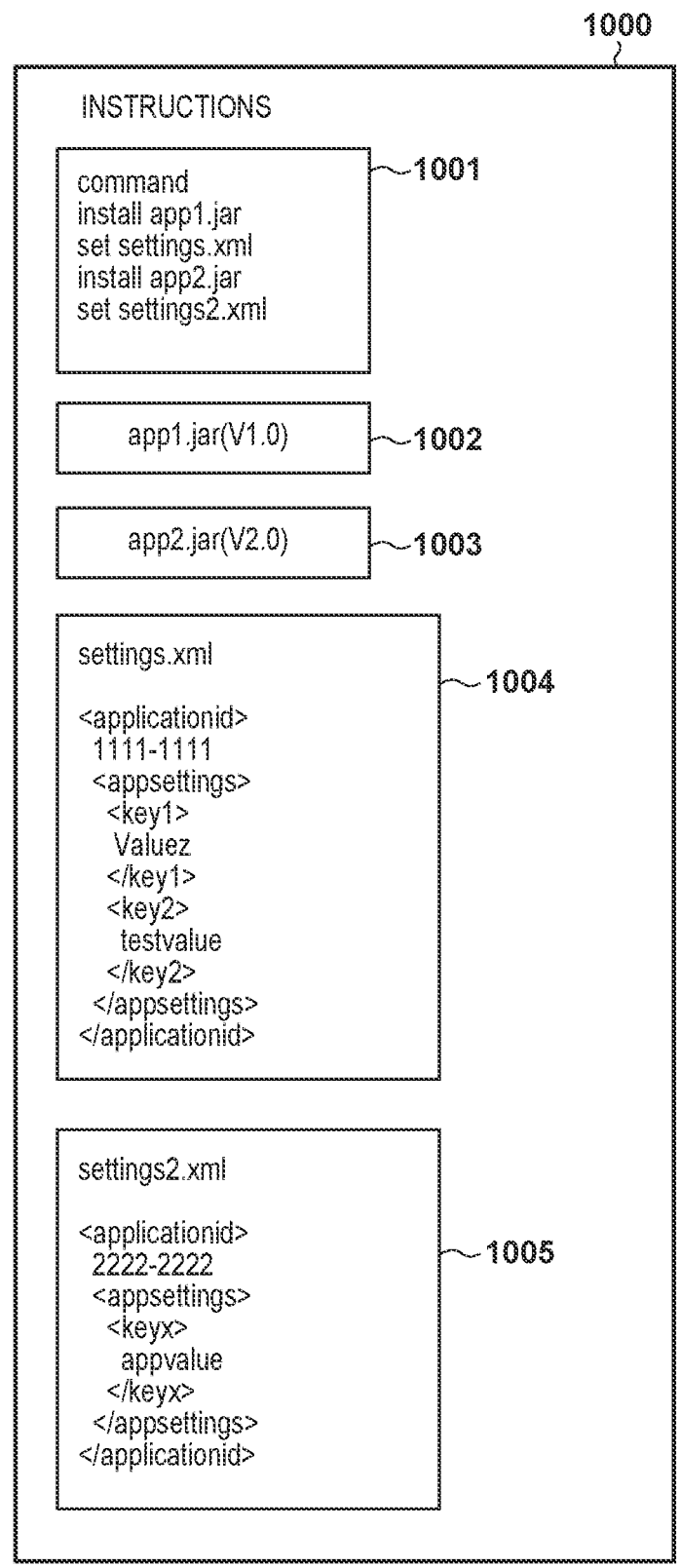
FIG. 10 is a diagram illustrating an example (version upgrade) of instructions for a function extension application.

FIG. 10 is an example of instructions 1000 for a function extension application according to the present embodiment. In the instructions 1000, an instruction command 1001 is described which includes an instruction to install the function extension applications app1.jar and app2.jar and an instruction to set the setting values described in settings.xml and settings2.xml. Also, the instructions 1000 include function extension application files for function extension applications to be installed named app1.jar1002 and app2.jar1003. Furthermore, the instructions 1000 include setting value files named settings.xml1004 and settings2.xml1005 describing setting items. Note that the instructions 1000 may include only a link to the function extension application file or the setting value file, or the file itself may be a different file from the instructions 1000. This is the same as in the first embodiment.

The instruction commands of the present instructions 1000 specifically include an instruction to install version Ver 1.0 of the function extension application app1.jar and an instruction to install version Ver 2.0 of the function extension application app2.jar. In addition, the instruction commands include instructions for setting, under an application ID "1111-1111" of the function extension application, appsettings as the root, valuez as a Key1 key, and testvalue as a Key2 key. Furthermore, the instruction commands include instructions for setting, under the application ID "2222-2222" of the function extension application, appsettings as the root and appvalue as a Keyx key. Note that as in the first embodiment, the instructions 1000 may use a different method than the method according to the present embodiment.

Description of Setting Values of Function Extension Application in Image Forming Apparatus FIGS. 11A to 11D are diagrams for describing setting values of a function extension application in the image forming apparatus 102. FIG. 11A illustrates the state of setting values, that is a setting value database 1101 with the setting values of the function extension application app1.jar applied. Referencing the version management table 900 managed by the version management unit 403 shows that the function extension application app1.jar (V1.0) described in the instructions 1000 is installed on the image forming apparatus 102 and setting values are already configured. Thus, the setting values of the setting value file settings.xml described in the instructions 1000 are applied without starting app1.jar (V1.0). Before the setting values in the instructions 1000 are applied, the setting values in FIG. 6C of the first embodiment are applied, but in setting values 1101, valuez is applied to Key1 and testvalue is applied to Key2.

FIG. 11B illustrates setting values 1111 in a state where the function extension application app2.jar (V1.0) is installed. According to instructions 1000, the install unit 401 upgrades the version of app2.jar to V2.0 from V1.0, and the application state management unit 402 starts app2.jar. Then, according to the function extension, KeyX key is added, valuexxxx is set as the initial value, and the setting values for app2.jar correspond to the state of setting values 1121 in FIG. 11C. Thereafter, the application state management unit 402 stops app2.jar, and the setting value applying unit 411 applies setting values 1005 for settings2.xml described in the instructions 1000. In this manner, Keyx is updated to appvalue as in setting values 1131 in FIG. 11D.

Figure 13:
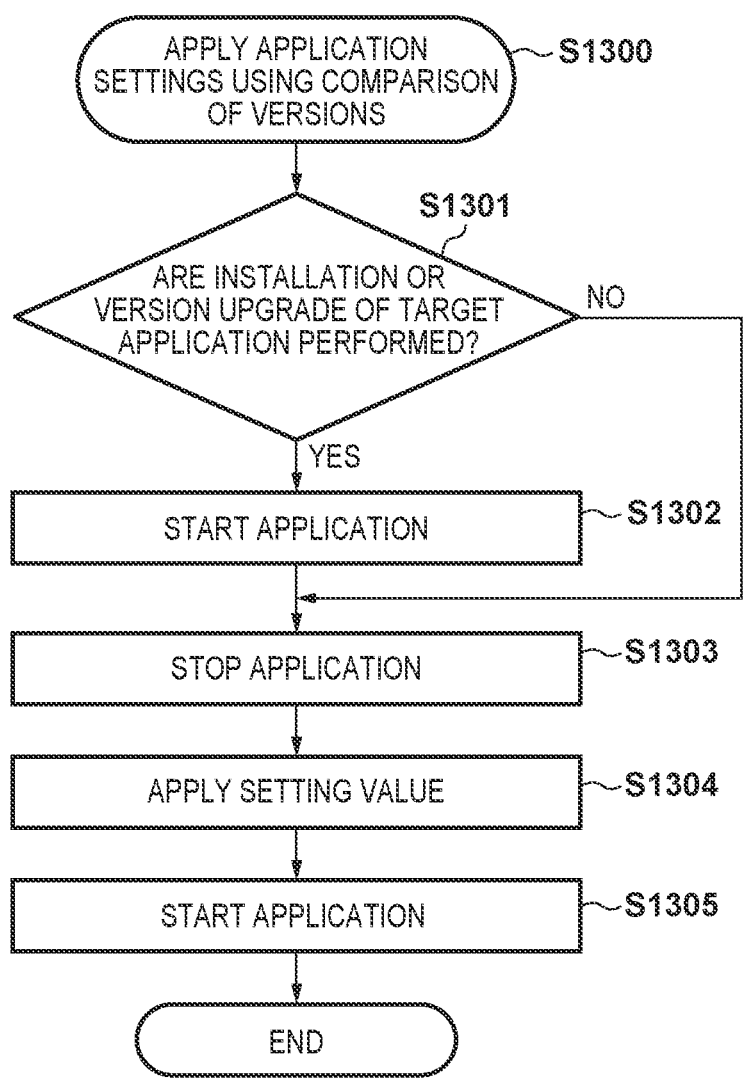
FIG. 13 is a flowchart of setting value application using a comparison of function extension application versions.

Function Extension Application Version Upgrade and Setting Value Applying Processing Next, the flow of upgrading the version of the function extension application and applying the setting values will be described using FIGS. 12 and 13. The instruction reception unit 420 of the instruction management service 312 receives instructions including a function extension application install instruction and a setting value application instruction (step S1201). Here, the instructions may be received via the install IF service 309, the instructions may be received via the UI 302, or the instructions may be received by a different function extension application that instructs for application installation and setting value application.

When the instructions 1000 are received, the instruction determining unit 421 analyzes the instructions 1000 (step S1202). The instruction command 1001 for the image forming apparatus 102 included in the instructions 1000 is analyzed, and processing for each one is executed. As a result of analyzing the instruction commands, the instruction determining unit 421 determines whether the instruction for the function extension application is an install instruction (step S1203). When the instruction command is not a function extension application install instruction, the processing proceeds to step S1208. When the instruction command is a function extension application install instruction, the instruction determining unit 421 checks the version of the application to be installed described in the instructions 1000 (step S1204). Herein, acquiring is sufficient for checking, for example. Subsequently, the version management unit 403 determines whether the function extension application to be installed is already installed (step S1205). When the function extension application is not installed, the processing proceeds to step S1208. When the function extension application is installed, the version management unit 403 acquires the version of the installed function extension application from the function extension application version management table 900 (step S1206).

The instruction determining unit 421 compares the version of the function extension application to be installed acquired in step S1204 and the version of the installed function extension application acquired in step S1206 (S1207). Then, if the versions match, the processing proceeds to step S1209 without installing the function extension application.

When the versions do not match in step S1207, the install unit 401 installs the function extension application described in the instructions 1000 (step S1208).

Specifically, the instruction determining unit 421 analyzes the instructions 1000 and checks for an instruction to install app1.jar. Since there is a function extension application install instruction, the instruction determining unit 421 checks for an install instruction for app1.jar V1.0. Subsequently, the version management unit 403 checks the version management table 900 for whether app1.jar with the application management ID of 1111-1111 is already installed. Since the application ID 1111-1111 is already installed and the version is V1.0, the processing proceeds without installing app1.jar.

The case of an instruction to install app2.jar will be described next. The instruction determining unit 421 analyzes the instructions 1000 and focuses on the instruction to install app2.jar. Since there is a function extension application install instruction, the instruction determining unit 421 checks for an install instruction for app2.jar V2.0. Subsequently, the version management unit 403 determines whether app2.jar with the application management ID of 2222-2222 is already installed using the function extension application version management table 900. It is determined that the application ID 2222-2222 is already installed and V1.0 is installed. Since the version of the installed function extension application and the version of the function extension application to be installed are different, the function extension application app2.jar is installed and the processing proceeds. The version management table 910 with the version of the function extension application ID 2222-2222 of the version management table 900 updated to V2.0 is generated.

When the instruction command is executed and the version of the function extension application is updated, the version management table 910 is updated. When the version management table 910 has been generated, information is added to the version management table 910 and managed.

Subsequently, in step S1202, the instruction determining unit 421 determines whether the analyzed instruction command is a setting applying instruction to apply setting values to a function extension application (step S1209). In step S1209, when it is determined that the instruction command is not a setting applying instruction, the processing proceeds to step S1211, the instruction commands of the instructions 1000 are read, and whether or not there is a next instruction command is checked. When there is a next instruction command, that instruction command is set as a processing target, and the processing from step S1203 to step S1211 is repeated.

Note that in the present embodiment, as described above, function extension application install commands and setting value application commands are described. Thus, when a command other than a function extension application install instruction command and a setting value applying instruction command is described in the instructions 1000, processing according to this instruction command is executed before determining whether there is a following instruction command in step S1211. When the instruction commands are executed until the end, the instruction checking is ended by the instruction determining unit 421 (step S1212). In step S1209, when the instruction command is determined to be a function extension application setting application instruction, the processing proceeds to step S1210. The processing of step S1210 is illustrated in FIG. 13.

In step S1301, the instruction determining unit 421 determines whether the target function extension application version upgrade or installation has been performed before the function extension application setting value application processing. In other words, it is determined whether the function extension application specified as the target for settings application is the application installed in step S1208 according to the install instruction included in the instructions including the setting application instruction. In such cases, the processing branches to step S1302, otherwise step S1302 is skipped and the processing branches to step S1303.

The present embodiment is different from the first embodiment in that the target function extension application is not determined to be installed simply by an install instruction being included in the instructions. This is because when whether the version is the same or different is determined in step S1207 and the version is determined to be the same, no installation is executed even if there is an install instruction. In other words, the determination of step S1301 may be executed via the following process in the case in which installation is not executed if there is no new installation or version upgrade, for example.

First, the setting value file (for example, the setting values 1005) specified in the setting applying instruction to be processed included in the same instructions 1000 as the setting applying instruction to be processed is referenced, and the target application ID is referenced. Then, the install instruction for the function extension application with the name corresponding to the application ID is searched for in the instructions 1000, and the found function extension application version is referenced. The application ID and version of the function extension application found here are targets of an install instruction of a function extension application targeted for applying settings included in the same instructions 1000 as the setting applying instruction to be processed. Then, the version management table 900 is searched using the application ID of the found function extension application, and if the corresponding function extension application is registered, whether the versions match is determined. If the versions do not match, it can be determined that the function extension application targeted for applying settings has been installed in the preceding step S1208. The corresponding function extension application not being registered in the version management table corresponds to the versions not matching.

On the other hand, when the corresponding function extension application is not included in the instructions 1000, the function extension application targeted for applying settings can be determined to not be installed by an install instruction included in the same instructions. Also, when there is a corresponding function extension application but the version does not match with the version in the version management table, the function extension application targeted for applying settings can be determined to not have been installed in the preceding step S1208.

Note that the association between the application ID of the function extension application and the name of the corresponding function extension application name may be performed as in the first embodiment. Also, the ID and version of the function extension application installed in step S1208 may be held for the determination in step S1301. In this case, whether the application ID of the function extension application, which is the target for a setting applying instruction, has been held in step S1208 is determined in step S1301. In the case in which this has been held, the held function extension application ID and version may be compared with the version management table and whether the same version has already been installed may be determined. The association between the application ID and the name of the function extension application may be performed as described above. The application ID and the name of the application may be used as identification information of the function extension application and may be collectively referred to as identification information. This also applies to the first embodiment.

In step S1302, the application state management unit 402 of the application management service 310 starts the installed function extension application (step S1302). In other words, the installed function extension application is transitioned to a started state. By starting the function extension application, the database is configured with the setting values added by the function extension of the function extension application as illustrated in FIG. 11C, and the initial setting values are applied.

Subsequently, the application state management unit 402 stops the function extension application started in step S1302 (step S1303). In other words, the installed function extension application is transitioned to a stopped state. Since operation of the function extension application cannot be guaranteed when rewriting the setting values while the function extension application is in use, the function extension application is stopped before the setting value applying processing. Stopping is performed as in step S803 in the first embodiment.

Subsequently, the setting value acquiring unit 410 acquires the setting value described in the instructions 1000, and the setting value applying unit 411 applies the acquired setting value as the setting value for the function extension application (step S1304). After the setting values are applied, to enable the function extension application to be used, the application state management unit 402 starts the function extension application (step S1305), and the processing ends.

When execution of all of the instruction commands is complete, the version management unit 403 updates the version management table 900 to the table 910, and the processing of step S1213 ends. Here, the association between the application ID and the name of the function extension application may be performed as described above as necessary.

As described above, according to the present embodiment, when upgrading the version of the function extension application, the setting values that wished to be changed can be applied and the setting values not to be changed can be carried over.

Note that the second embodiment is applicable to not only cases in which the previous version of the function extension application is upgraded to the new version but also to cases in which a function extension application update to a new version is returned to the previous version.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-077693, filed May 10, 2022 which is hereby incorporated by reference herein in its entirety.

What is claimed is:

1. An information processing apparatus comprising:
   at least one memory storing at least one program; and
   at least one processor, wherein
   the at least one program causes the at least one processor to perform:
   according to an install instruction for installing a specified application program included in received instruction information, installing the specified application program, wherein a setting item of the specified application program is not configured by installation of the specified application program;
   according to a setting applying instruction included in the received instruction information, applying a setting value included together with the setting applying instruction to a setting item of the specified application program stored in a database, and
   the applying includes:
      determining whether or not the specified application program is an application program installed in accordance with the install instruction included in the instruction information together with the setting applying instruction,
      executing the specified application program to configure the setting item having a predetermined initial value in the database by the specified application program in a case where the specified application program is determined to be an application program installed in accordance with the install instruction included in the instruction information together with the setting applying instruction,
   stopping the specified application program,
   updating a setting value of the setting item of the specified application program with a setting value received together with the setting applying instruction, the setting item being configured in the database, and
   starting the specified application program with the setting value applied.

2. The information processing apparatus according to claim 1, wherein
   the specified application program is determined to be an application program installed in accordance with the install instruction included in the instruction information together with the setting applying instruction in a case where the specified application program is an application program targeted by the install instruction included in the instruction information including the setting applying instruction and a version of the application program targeted by the install instruction is different from a version of the application program already installed.

3. The information processing apparatus according to claim 1, wherein
the instruction information includes a specification of an application program targeted by the setting applying instruction, a specification of a setting item, and a setting value corresponding to the setting item, and
the applying includes applying the setting value corresponding to the setting item to the specified setting item of the specified application program.

4. The information processing apparatus according to claim 1, wherein
the instruction information includes an application program that is a target for the install instruction.

5. The information processing apparatus according to claim 1, wherein
the setting item includes a key and a corresponding setting value, and
there is no setting item immediately after the specified application program is installed.

6. A non-transitory computer-readable medium storing a program, the program causes a computer to perform:
according to an install instruction for installing a specified application program included in received instruction information, installing the specified application program, wherein a setting item of the specified application program is not configured by installation of the specified application program;
according to a setting applying instruction included in the received instruction information, applying a setting value included together with the setting applying instruction to a setting item of the specified application program stored in a database, wherein
wherein the applying includes:
determining whether or not the specified application program is an application program installed in accordance with the install instruction included in the instruction information together with the setting applying instruction,
executing the specified application program to configure the setting item having a predetermined initial value in the database by the specified application program in a case where the specified application program is determined to be an application program installed in accordance with the install instruction included in the instruction information together with the setting applying instruction,
stopping the specified application program,
updating a setting value of the setting item of the specified application program with a setting value received together with the setting applying instruction, the setting item being configured in the database, and
starting the specified application program with the setting value applied.

7. A settings application method executed by an information processing apparatus, the method comprising:
according to an install instruction for installing a specified application program included in received instruction information, installing the specified application program, wherein a setting item of the specified application program is not configured by installation of the specified application program;
according to a setting applying instruction included in the received instruction information, applying a setting value included together with the setting applying instruction to a setting item of the specified application program stored in a database,
wherein the applying includes:
determining whether or not the specified application program is an application program installed in accordance with the install instruction included in the instruction information together with the setting applying instruction,
executing the specified application program to configure the setting item having a predetermined initial value in the database by the specified application program in a case where the specified application program is determined to be an application program installed in accordance with the install instruction included in the instruction information together with the setting applying instruction,
stopping the specified application program,
updating a setting value of the setting item of the specified application program with a setting value received together with the setting applying instruction, the setting item being configured in the database, and
starting the specified application program with the setting value applied.

* * * * *